Nov. 26, 1940.　　　D. H. MILLS　　　2,222,625
FENDER SHIELD AND ASSEMBLY
Filed Jan. 9, 1939　　　3 Sheets-Sheet 1
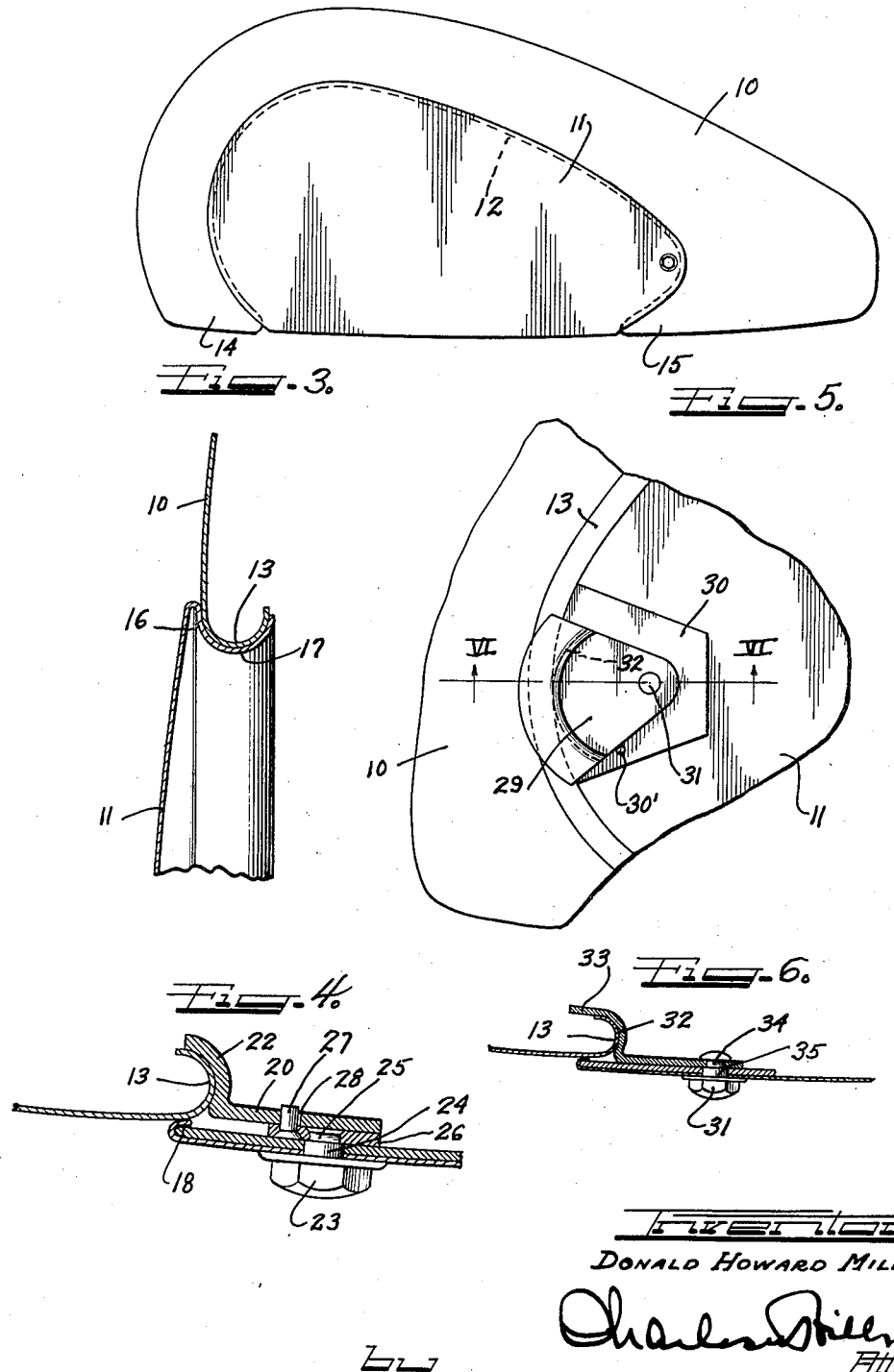
Inventor
DONALD HOWARD MILLS.

Nov. 26, 1940.  D. H. MILLS  2,222,625
FENDER SHIELD AND ASSEMBLY
Filed Jan. 9, 1939   3 Sheets-Sheet 2
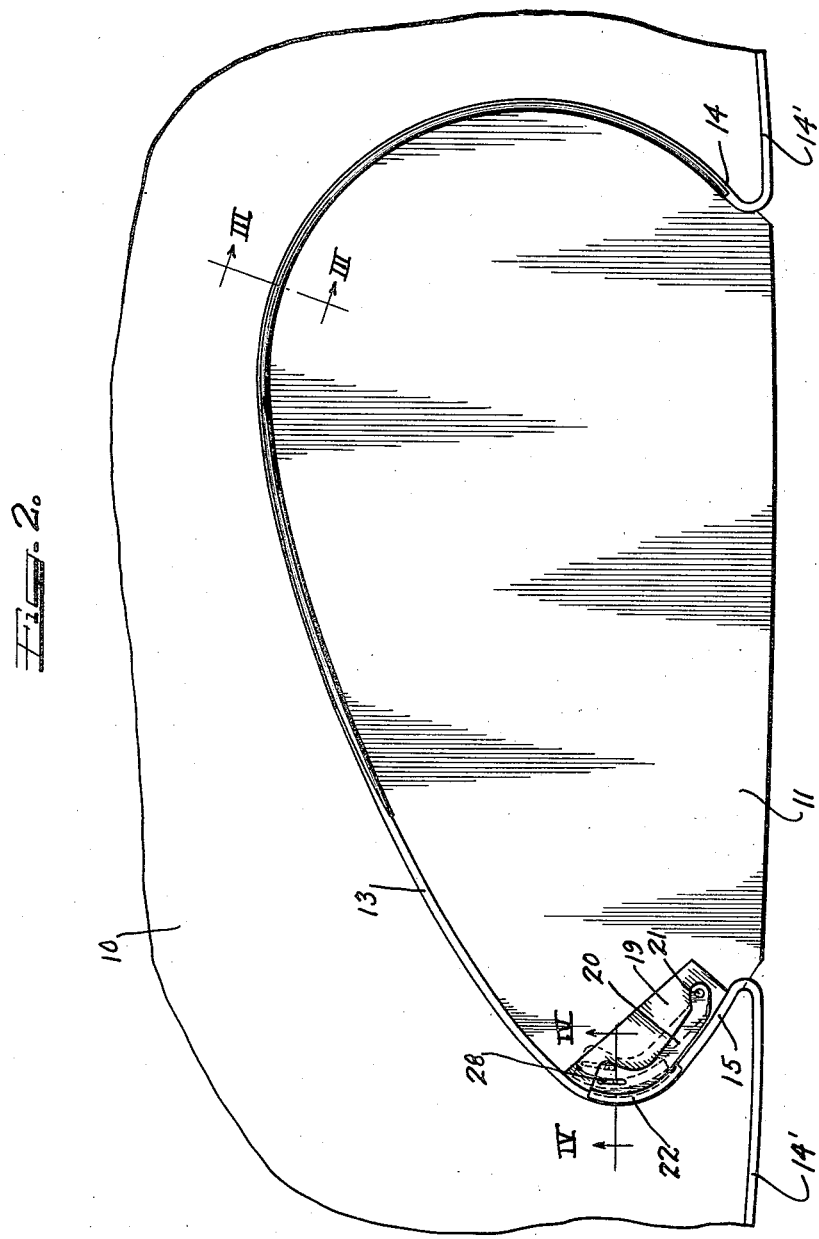
Inventor
DONALD HOWARD MILLS.

Nov. 26, 1940.  D. H. MILLS  2,222,625

FENDER SHIELD AND ASSEMBLY

Filed Jan. 9, 1939  3 Sheets-Sheet 3

Inventor
DONALD HOWARD MILLS.

Patented Nov. 26, 1940

2,222,625

UNITED STATES PATENT OFFICE 2,222,625

FENDER SHIELD AND ASSEMBLY

Donald Howard Mills, Detroit, Mich., assignor to Houdaille-Hershey Corporation, Detroit, Mich., a corporation of Michigan Application January 9, 1939, Serial No. 249,931

10 Claims. (Cl. 280—153)

This invention relates to wheel guards or shields, and more particularly to a fender or fender shield and assembly or the like wherein the fender shield has a streamlined configuration. This invention also relates to a novel means for securing a shield in place over a wheel access opening in a downwardly depending wall of a vehicle body part.

In the vehicle industry, and particularly in the automobile industry, various means have been utilized to improve the appearance of vehicle fenders or the like. The usual vehicle fender is provided with an opening which affords access to the vehicle wheel, and which permits the ready removal of the wheel in an axial direction. This opening inherently presents an unattractive outward appearance and accordingly detachable fender shields have been employed to substantially cover this opening. As the term "fender shield" shall hereinafter be employed, it refers to any member which is adapted to be secured to a fender or other portion of a vehicle body for the purpose of covering the opening in the vehicle body or fender which is provided for access to or removal of the vehicle wheel. It is also to be understood that the term "fender" is used in a broad sense, and denotes any part of a vehicle body, whether separate or integral, which includes an outer depending side wall which overhangs the vehicle wheel.

It is an object of the present invention to provide a novel fender and fender shield assembly.

It is a further object of the present invention to provide a novel fender shield or the like which is economical to manufacture and which is rugged and reliable in use. It is a still further object of this invention to provide novel supporting and latching means for detachably securing a shield in place over the wheel opening of a vehicle body part.

Another and further object of this invention is to provide a novel fender shield and combination of a fender shield with a fender wherein the fender shield may be rotated into place and latched by a single latching means.

Another and still further object of this invention is to provide a novel fender and fender shield assembly in which the fender is provided with an opening in the shape of a spiral and in which the fender shield has a complementary edge portion adapted to be seated on the opening defining edge of the fender.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a front elevational view of a fender and fender shield assembly illustrating one embodiment of the present invention;

Figure 2 is an enlarged rear elevational view of the fender and fender shield assembly shown in Figure 1;

Figure 3 is a greatly enlarged fragmentary cross-sectional view of a portion of the assembly taken along the line III—III of Figure 2;

Figure 4 is an enlarged cross-sectional fragmentary view of the locking mechanism as taken along the line IV—IV of Figure 2;

Figure 5 illustrates a different form of locking mechanism which may be employed in a fender and fender shield assembly of the type illustrated in Figure 1;

Figure 6 is a cross-sectional view of the form of locking mechanism as shown in Figure 5 and is taken along the line VI—VI thereof;

Figure 7 is a rear elevational view of a fender and fender shield assembly illustrating a different embodiment of the present invention; and, Figure 8 is a sectional view taken along the line VIII—VIII of Figure 7.

Referring now to the first embodiment of the present invention, which is not necessarily the preferred embodiment, there is illustrated therein a vehicle fender 10 of a high crown type. Mounted on and detachably secured to the fender 10 is a fender shield 11 which is streamlined in shape and designed to harmonize with the fender 10. As is indicated by the dotted line in Figure 1, the fender 10 is provided with a wheel access opening 12, which is of substantially the same shape as the fender shield 11. The edge portion of the fender 10 around the opening 12 is underturned or rolled as at 13 (see Figure 3). The base edges of the fender 10 are also underturned as at 14' to increase the rigidity of the fender.

The type of fender which is illustrated in Figure 1, is of an unusual and novel type, and is described and claimed per se, in my copending application entitled "Fender, fender shield, and assembly," U. S. Serial No. 249,930, filed on January 9, 1939, and assigned to the same assignee as the present invention. The fender 10 illustrated in Figure 1 differs from all known structures in that the lower portion of the fender opening at each end thereof curves back on itself, thus providing a pair of confronting neck portions or shoulders 14 and 15. These confronting neck portions or shoulders 14 and 15 on the fender 10 are capable of performing a function which no previously known fender is capable of; namely, providing a seat upon which the fender shield may be seated. The neck portions or shoulders 14 and 15 comprise the sole vertical supporting means for the fender shield 11.

The fender shield 11 is substantially coextensive with the opening 12. The curved edge of the fender shield 11 throughout more than half its length beginning with the lower corner of the leading edge of the fender shield 11 is folded back on itself as at 16 and then curved rearwardly and radially outwardly as at 17 to form a radially outwardly opening channel portion which is arranged to be seated on the underturned edge 13 of the fender 10 (see Figures 2 and 3). The remaining portion of the curved edge of the fender shield 11 is simply folded back on itself without extending into a channel portion 17. The trailing edge of the fender shield 11 is turned back as at 18 over a latch mounting plate 19 which is spot welded or otherwise suitably secured to the rear face of the fender shield 11 (see Figure 4).

From an inspection of Figure 2 of the drawings, it will be apparent that the forward or leading portion of the fender shield 11 is supported on the shoulder 14 and is held in firm and tight engagement with the fender 10 by virtue of the nested relationship of the channel portion 17 of the fender shield 11 with the underturned edge 13 of the fender 10. The fender shield 11 may be conveniently slid into this position by moving it obliquely upwardly and forwardly.

Additional means must be provided for supporting and latching the trailing edge of the fender shield 11 in position on the fender 10. One form of latching means for carrying out this function is illustrated in Figures 2 and 4 of the drawings. More particularly, a latching arm 20 is pivotally mounted to the latch mechanism supporting plate 19 as at 21. The upper free end of the latching arm 20 is shaped to fit the confronting curve of the fender opening 13 and is also shaped to be nested thereon as at 22. Mounted on the fender shield 11 opposite an intermediate portion of the latching arm 20 is an operating bolt 23 which extends through the fender shield 11 from the outside to the inside thereof. The operating bolt 23 includes a circular shank portion 24 which is journalled in the latch mechanism supporting plate 19 and in the fender shield 11 itself, as is shown in Figure 4. The rear portion of the operating bolt 23 is provided with a square cross-sectional configuration as at 25 over which a plate 26 is mounted. It is, of course, to be understood that the plate 26 rotates with the operating bolt 23. Mounted in the plate 26 and spaced from the axis of rotation of the operating bolt 23 is a pin 27 which extends through a slot 28 in the latching arm 20.

The operating bolt 23 is so located on the fender shield 11 that when it is rotated the pin 27 causes the latching arm to move from its full line position as shown in Figure 2 to its dotted line position as shown in Figure 2. This angular movement of the latching arm 20 out of engagement with the underturned edge 13 of the fender 10 and enables the latching arm 20 to be moved to a position where it may pass through the opening 12 in the fender 10, and may thereafter be rotated down into tight nested engagement with the underturned edge 13 of the fender 10. This movement of the latching arm 20 into nested engagement with the underturned edge 13 of the fender 10 not only enables the fender shield to be held in tight engagement with the fender 10 at this point but also causes an obliquely forward and upward thrust on the fender shield which holds the channel-shaped edge portion 17 of the fender shield in tight nested engagement with the opposite end of the underturned edge 13 of the fender 10. The operating bolt 23 is also preferably located in such a position that when the latching arm 20 is in its locked or nested position, the pin 27 is in an overcenter position which automatically locks the latching arm 20 in this position.

In Figures 5 and 6 I have illustrated a modified form of latching mechanism which may be employed on a fender shield of the type illustrated and described in connection with the first embodiment of the invention. More particularly, a latching mechanism is provided, including a latch plate 29 which is carried by an operating bolt 31 which in turn is pivotally mounted to latch mechanism supporting plate 30. The latch mechanism supporting plate 30 is spot welded or otherwise suitably secured to the rear face of the fender shield 11 in proximity to its trailing edge and in substantially the same general location as the latch mechanism is located, as shown in Figure 2 of the drawings. The latch plate 29 is provided with a curved cam shoulder 32 which is arranged to be cammed into tight engagement with the underturned edge 13 of the fender 10. The shoulder 32 terminates in a radially outwardly extending flange 33 which engages the rear edge of the underturned portion 13 of the fender 10. The center of curvature of the cam surface or shoulder 32 is preferably disposed at a point below the pin 31 in order that the latching plate 29 may be moved to an overcenter position when the fender shield 11 is mounted on the fender 10. The latching plate 29 will thus automatically stay in a latched or locked position when this condition exists.

The operating bolt 31 upon which the latching plate 29 is mounted extends through the fender shield 11 from the front to the rear side thereof, the rear end portion of the bolt 31 being square in cross-section, as at 34, where the latching plate 29 is mounted thereon, in order that the latching plate 29 will rotate when the operating bolt 31 is rotated. The intermediate portion 35 of the shank of the operating bolt 31 is circular in cross-section and is journalled in the supporting plate 30 and in the fender shield 11 itself, as is clearly shown in Figure 6 of the drawings.

A fender shield having a latching mechanism such as that shown in Figures 5 and 6 is mounted on the fender 10 in substantially the same manner as that described in connection with the fender shield illustrated in Figures 1 to 4 of the drawings.

Figures 7 and 8 illustrate a third embodiment of the present invention. More specifically, there is shown therein a vehicle fender of a high-crown type 36 which is provided with a substantially spiral-shaped wheel access opening therein. The fender 36 has a turned back neck or shoulder 37 at the lower corner of the leading edge of the fender opening which corresponds to the neck portion or shoulder 14 of Figure 2. The trailing portion of the fender opening, however, is not turned back as is shown in Figure 2, but continues downwardly in an oblique direction, as at 38. The shape of the curve forming this wheel opening in the fender 36 may either be substantially in the form of a spiral, or it may be substantially in the form of a true arc of a curve over the leading portion of its edge as from A to B and then merge into a curve of progressively increasing radius of curvature from B to C. The important guiding consideration in determining the shape of this curve is that at no place shall the radius of curvature decrease in progressing from A to C.

A fender shield 39 is provided for the fender 36 which is substantially coextensive with the wheel opening provided therein. The marginal edge portion of the fender shield 39 is bent back on itself and then into a radially outwardly opening channel which is of the same shape and cross-sectional configuration as the channel shaped edge portion illustrated in Figure 3 in connection with the first embodiment of the present invention. It is to be understood that this channel-shaped edge portion of the fender shield 39 is designed and shaped to be firmly nested and seated on the underturned opening defining edge 40 of the fender 36. It will further be understood that the forward or leading edge of the fender shield 39 is vertically supported on the shoulder or neck portion 37 of the fender 36 in the same manner that the forward or leading edge of the fender shield 11 is supported on the fender 10 in Figure 1. Due to the nesting engagement of the channel shaped edge portion 41, lateral movement of the fender shield 39 with respect to the fender 36 is prevented. Additional supporting means must, however, be provided for the trailing edge of the fender shield 39.

One form of such supporting means is illustrated in Figure 8 of the drawings. More specifically, a latching arm 42 in the nature of a relatively stiff resilient wire is provided on the fender shield 39 for engagement with the underturned base edge 43 of the fender 36. The spring arm 42 is carried on a supporting stud 44 which in turn is carried by a supporting plate 45 that is spot welded or otherwise suitably secured to the rear face of the fender shield 39 in proximity to the lower corner of its trailing edge. An intermediate portion 46 is wrapped in the form of a helix for disposition around the supporting stud 44. One end portion 47 of the latching arm 42 is bent to extend around the underturned edge 40 of the fender 36 and then downwardly into engagement with the underturned edge 43 of the fender 36. The opposite end 48 of the latching arm 42 is bent to extend downwardly into engagement with the rearwardly bent base flange 49 of the fender shield 39. When the end portion 48 of the latching arm 42 is hooked over the base flange 49 of the fender shield 39, the latching mechanism is prevented from rotating in such a manner as to free the fender shield 39 from the fender 36.

To mount the fender shield 39 in position on the fender 36, the fender shield 39 is moved to the position as shown by the dotted lines in Figure 7. That is to say, the fender shield 39 is moved up so that the leading edge of the fender shield 39 is nested over the underturned edge 40 of the fender 36 along the leading edge of the fender opening. The fender shield 39 is then rotated in a clockwise direction as viewed in Figure 7 of the drawings, until the entire channel-shaped edge portion 41 of the fender shield 39 is seated and nested over the underturned edge 40 of the fender 36. The end 47 of the latch 42 is then sprung into engagement with the underturned base edge 43 of the fender 36 and the rear portion 48 is snapped over the base flange 49 of the fender shield 39 to lock the latch mechanism 42 in place. The fender shield 39 is now in tight mounted engagement on the fender 36. To remove the fender shield 39 from the fender 36 the reverse operation is carried out.

While I have shown particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. In a fender and fender shield assembly, the combination comprising a fender having a wheel opening in a wall thereof, the opening defining edge of said fender at one end thereof curving back on itself to provide a fender shield supporting seat, and a fender shield disposed over said opening and being substantially coextensive therewith, said shield having an outwardly opening channel portion opposite said curved-back portion of said opening defining edge and adapted to be nested thereover, and movable latch means at the opposite end of said shield engageable with said fender for securing and supporting that end of said fender shield on said fender.

2. In a fender and fender shield assembly, the combination comprising a fender having a wheel opening in a wall thereof, the opening defining edge of said fender at one end thereof curving back on itself to provide a fender shield supporting seat, and a fender shield disposed over said opening and being substantially coextensive therewith, said shield having an outwardly opening channel shaped edge portion opposite said curved-back portion of said opening defining edge of said fender and adapted to be nested thereover, and cam means at the opposite end of said fender shield for maintaining the nested engagement of said shield with said fender.

3. In a fender and fender shield assembly the combination comprising a fender having a wheel opening in a wall thereof, and a fender shield mounted on said fender over said opening, the opening defining edge of said fender at one end thereof being substantially in the shape of an arc of a circle and having its lower extremities terminating vertically under an intermediate portion of the curved opening defining edge of said fender thereby providing a fender shield supporting seat upon which one end of said fender shield may be vertically supported, said shield having at least a portion of the curved edge of said fender shield including the edge lying opposite said fender seat shaped to form a channel portion which is nested over and seated on said opening defining edge of said fender including said seat portion thereof, and means at the opposite end of said fender shield including an angularly movable cam arm for maintaining said fender shield channel portion in engagement with the opening defining edge of said fender.

4. As an article of manufacture, a fender shield for disposition over the wheel access opening of a vehicle fender, said fender shield having a substantially spiral shaped curved edge, the end portion thereof having the shorter radius of curvature terminating vertically under an intermediate portion of said curved edge, the marginal 5. As an article of manufacture, a fender shield for disposition over the wheel access opening of a vehicle fender, said fender shield having a substantially spiral shaped curved edge, the end portion thereof having the shorter radius of curvature terminating vertically under an intermediate portion of said curved edge, the marginal portion around said curved edge forming a radially extending outwardly opening channel-shaped flange, and a latching member in proximity to the end portion of said curved edge having the greater radius of curvature for detachably engaging the vehicle fender.

6. As an article of manufacture, a fender shield for disposition within the wheel access opening of a vehicle fender, the outer peripheral boundary of said fender shield being substantially coextensive with said fender opening, one end of said shield being arranged to seat on and be vertically supported by the opening defining edge of said fender and a latching arm secured to the opposite end of said shield having a seat portion for bearing against the opening defining edge of said fender to vertically support said opposite end of said shield and retain said one end of said shield in seated engagement on said opening defining edge, said latching arm also having a flange for engagement with said fender behind said opening defining edge and said latching arm being angularly movable in a plane substantially parallel to the plane of the fender shield to a position where said flange will pass through said fender opening while the end of said fender shield opposite the end on which said latching arm is secured is in engagement with said opening defining edge of said fender.

7. As an article of manufacture, a fender shield for disposition within the wheel access opening of a vehicle fender and being substantially coextensive therewith, one end of said shield being arranged to rest on and be disposed against the opening defining edge of said fender and a latching member pivotally mounted to said fender shield at the opposite end thereof from said portion which is disposed to rest on said opening defining edge of said fender, said latching member having a radially outwardly facing arcuate surface for engagement with the opening defining edge of said fender, the radius of curvature of said arcuate surface being substantially less than the radius of curvature of that portion of the opening defining edge of said fender which lies adjacent thereto, said latching member being movable to a locked position when said shield is mounted on said fender whereby an end thrust is applied to said fender shield and wherein the center of the radius of curvature of said arcuate portion is disposed below the pivot point of said latching member whereby said latching member is maintained in an overcenter position when said shield is disposed in mounted engagement on said fender.

8. In a fender and fender shield assembly the combination comprising a fender having a wheel opening defined by an underturned rolled marginal portion, and a fender shield substantially coextensive with said opening and having a channel-shaped edge portion complementary to and seated on said underturned rolled marginal portion, the opening defining edge of said fender at one end of said opening being substantially an arc of a circle and being shaped and disposed so that an imaginary vertical line will intersect it in two places.

9. In a fender and fender shield assembly, the combination comprising a fender having a wheel opening defined by an underturned rolled marginal portion, and a fender shield substantially coextensive with said opening and having a channel-shaped edge portion complementary to and seated on said underturned rolled marginal portion, the opening defining edge of said fender at one end of said opening being substantially an arc of a circle and being shaped and disposed so that an imaginary vertical line will intersect it in two places, said shield being movable into place on said fender by slidably rotating said shield in the plane of the fender opening along the arcuate portion of said opening defining edge of said fender.

10. In a fender and fender shield assembly, the combination comprising a fender having a wheel access opening defined by an underturned rolled marginal portion, and a fender shield substantially coextensive with said opening and having a channel shaped edge portion complementary to and seated on said underturned rolled marginal portion, the opening defining edge of said fender at one end of said opening being substantially an arc of a circle and being shaped and disposed so that an imaginary vertical line will intersect it in two places, said shield being movable into place on said fender by slidably rotating said shield in the plane of the fender opening along the arcuate portion of said opening defining edge of said fender, and latch means on said fender shield engageable with said fender for preventing reverse rotation of said shield.

DONALD HOWARD MILLS.